March 13, 1928.

J. KJEKSTAD 1,662,369

ARC WELDING SYSTEM

Filed Aug. 1, 1918

WITNESS:

INVENTOR.
Johannes Kjekstad
BY
Rosenbaum, Stockbridge & Borst
ATTORNEYS

Patented Mar. 13, 1928.

1,662,369

UNITED STATES PATENT OFFICE.

JOHANNES KJEKSTAD, OF BROOKLYN, NEW YORK, ASSIGNOR OF ONE-HALF TO WILLIAM SCHENSTROM, OF BROOKLYN, NEW YORK.

ARC WELDING SYSTEM.

Application filed August 1, 1918. Serial No. 247,734.

My invention relates to electric arc welding and is broadly applicable to both carbon arc welding in which the work constitutes one electrode and a carbon rod or pencil constitutes the other electrode, and to metallic arc welding in which one electrode is a metallic rod or pencil which is consumed and deposited by the arc upon the other electrode or work to be welded.

It is important that the character of the weld be as uniform as possible throughout. In carbon arc welding it is therefore important that the line of weld be evenly heated which requires that the rate of travel of the arc along the work be commensurate with the heat of the arc. Also it is a desideratum in metallic arc welding to obtain a uniform deposit or string of the metal along the line of weld. Since in the latter case the rate at which metal is being deposited seems to increase with the temperature of the arc, it becomes a common requisite for both kinds of electric welding that the arc be moved at a rate commensurate with its temperature.

The temperature of the arc is determined by the proportion between the rate at which heat is being produced in the arc and the rate at which it is being dissipated, the heat production increasing with the watt consumption; i. e., the product of amperage and the voltage across the arc, and the dissipation with the length of the arc.

A change in arc length will also directly affect the watt consumption. Thus, if the arc is fed from a source of constant voltage, an increase in its length will also increase its resistance, causing the voltage across the arc to rise and the amperage to drop, giving a new value for the watt consumption.

Apparently the proportion between watt consumption and heat dissipation; i. e., the temperature, decreases with a lengthening of the arc because it results in a falling off of the rate at which the electrode is consumed.

In practice it is impossible to maintain the length of an arc constant. For instance, in the manual operation of welding, the natural unsteadiness of the hand causes the arc, and hence its temperature, to vary; to insure a uniform weld the rate of movement of the arc along the weld would have to be varied accordingly, but this is manifestly an accomplishment equally impossible of attainment in manual operation.

An object of my invention is to provide means for automatically regulating the movement of the arc across the work and thereby in carbon arc welding obtain a substantially uniform heating along the line of the weld, and in metallic arc welding obtain a uniform string irrespective of variations in the arc.

This is accomplished, in accordance with my invention, by providing a carriage for one of the electrodes and an automatic feeding device for the carriage, and automatically regulating the feed of the device by the arc. Preferably the device is an electro-magnetic device responsive to variations in resistance across the arc.

My invention also comprehends various other features of construction and arrangements of parts, as will hereinafter more fully appear.

I shall now describe the illustrated embodiment of my invention and shall thereafter point out my invention in claims.

Figure 1:
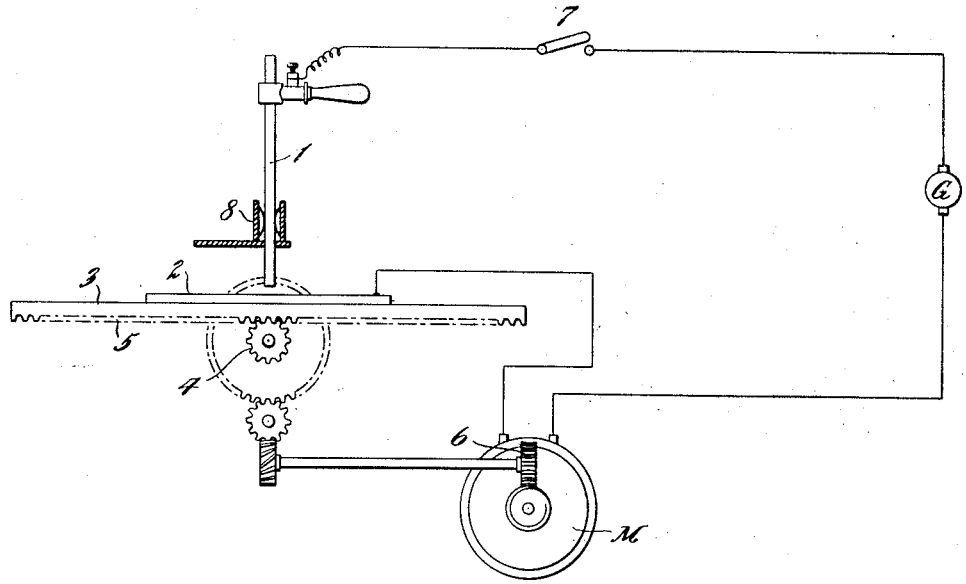
Fig. 1 is a schematic view of one embodiment of my invention.

For purposes of illustration the electrode 1 is assumed to be a metallic electrode, and is shown as provided with a handle for manual control of the length of the arc, although it will be understood that any suitable automatic device could be employed for that purpose. In order to cause the arc to travel along the seam or line of weld of the work 2, either the electrode 1 or the work 2 is translated. In the illustrated embodiment the work is shown as mounted upon a table 3 which is translated by gearing 4 cooperating with a rack 5 on the under side of the table. An electric motor M in Figure 1 is arranged in series with the arc and communicates power to the gearing 4 through suitable reduction gearing 6. Current is supplied from a generator G.

To initiate the operation the operator closes the switch 7 and momentarily brings the electrode 1 into contact with the work 2 at the beginning of line of weld and then withdraws the electrode sufficiently to strike an arc. In order to hold the electrode 1 steady in the line of its axis and prevent any lateral movement thereof, a suitable guide 8 may be employed in manual, as well as automatic control of the electrode. The motor M promptly starts to feed the table along at a rate dependent upon the current. The shorter the arc the higher the amperage and also the faster the rate of deposit of the metal upon the work, and vice versa. Therefore the rate of feed of the table is dependent upon the length of the arc, and the result is that the table is fed substantially in proportion to the rate of deposit of the metal.

Figure 2:
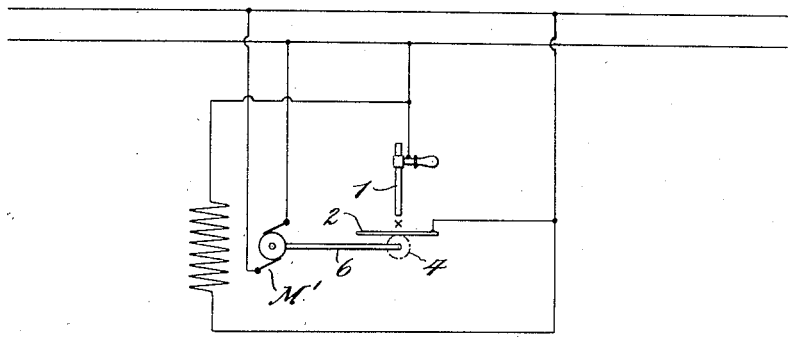
Fig. 2 is a diagrammatic view of a modification of the same.

The same result may also be obtained in other ways. For instance, as shown in Figure 2, the motor M' may have its field connected in shunt with the arc, and as a consequence of the field strength varying inversely with the amperage at the arc, the motor will accelerate with a decrease in the length of the arc, and vice versa.

It is obvious that various modifications may be made in the constructions shown in the drawings and above particularly described within the principle and scope of my invention.

I claim:

1. An electric arc welding system comprising the combination with the work and an electrode arranged to have an arc established between them, of an electric motor operative to translate the electrode relative to the work and so arranged in the electric circuit that it will accelerate on a decrease in the length of the arc and decelerate on an increase in the length of the arc.

2. An electric arc welding system comprising an electric circuit including the work and an electrode arranged to have an arc established between itself and the work, a movable support for the work, a source of current for said circuit and an electric motor disposed in said circuit and operative to move the support and responsive to variations in resistance across the arc.

3. An arc welding machine, comprising a fusible electrode cooperating with the welding joint to strike an arc at said joint, means for progressively presenting said joint to said electrode, and means controlled by voltage variations in said arc for controlling the speed of progression of said joint.

In witness whereof, I subscribe my signature.

JOHANNES KJEKSTAD.